United States Patent [19]

Paetsch

[11] 3,819,858

[45] June 25, 1974

[54] DATA SIGNAL SYNCHRONIZER

[75] Inventor: Werner Paetsch, Munich, Germany

[73] Assignee: Siemens Aktiengesellschaft, Berlin and Munich, Germany

[22] Filed: Sept. 25, 1972

[21] Appl. No.: 292,114

[30] Foreign Application Priority Data

Sept. 23, 1971 Germany .......................... 2147565

[52] U.S. Cl. .......................................... 178/69.5 R

[51] Int. Cl. .......................................... H04l 7/08

[58] Field of Search ........... 178/69.5 R; 179/15 BS; 328/72; 307/269

[56] References Cited

UNITED STATES PATENTS

| | | | |
|---|---|---|---|
| 3,069,504 | 12/1962 | Kaneko | 178/69.5 R |
| 3,317,669 | 5/1967 | Ohnsorge | 178/69.5 R |
| 3,482,044 | 12/1969 | Kaneko | 178/69.5 R |
| 3,546,592 | 12/1970 | Mayo | 178/69.5 R |
| 3,581,010 | 5/1971 | Kobayashi | 178/69.5 R |
| 3,594,502 | 7/1971 | Clark | 178/69.5 R |

*Primary Examiner*—Robert L. Griffin
*Assistant Examiner*—George G. Stellar
*Attorney, Agent, or Firm*—Schuyler, Birch, Swindler, McKie & Beckett

[57] ABSTRACT

A telegraph signal synchronizer is described which includes a code verifier capable of testing groups of bits in overlapping fashion for determining the presence of a code word. A frequency divider produces an output pulse whenever it receives as many bits as constitute a code word. The divider receives an input signal over an AND gate, which is controlled by output pulses from a code verifier. The code verifier utilizes a preset counter to produce a first signal if it recognizes a code word and a second signal if the bit group undergoing examination does not prove to be a code word. A shift register stores a bit group to be examined. Upon receiving a preceding bit of the message and until receiving a subsequent bit of this message, bits stored in the shift register are read out serially, passed over a feedback path and coupled to an input of the same shift register. All bits except the aforementioned preceding and subsequent bits are coupled to the code verifier counter's input.

6 Claims, 4 Drawing Figures

DATA SIGNAL SYNCHRONIZER

BACKGROUND OF THE INVENTION

This invention relates to a data signal synchronizer to which data are fed in the form of a sequence of bits, and wherein special combinations of these bits form code words. A code verifier is provided which verifies if groups of consecutive bits are code words. A receiver means is controlled such that code words are evaluated at the receiving end. The invention is particularly useful for processing telegraph signals.

In a telegraph system of known construction an inverter is controlled, as well as a receiver, by means of a code. That is, a code verifier acts to periodically reverse the polarity of a group of bits at specified time intervals. In this way, the polarity of the code words reversed at the transmitting end is also reversed at the receiving end. The inverter provided at the receiving end must, therefore, be controlled in phase with the reversal carried out at the transmitting end.

In prior art synchronous telegraph systems, a first group of consecutive bits, e.g., consecutive bits 1 to 7, is first checked by means of a code verifier to determine whether this group is a code word. In a code, which, for example, assigns to all the characters a combination of bits constituted by three one values and four zero values each, it is verified by means of the aforesaid code verifier if the single groups are made up of exactly three one values and four zero values. An error signal is produced in response to a different test result. After testing the first seven bits (e.g., the bits 1 to 7), the next seven bits (bits 8 to 14) are checked. Thus, the test result is not obtained until each group has been received, and the receipt of a further combination of bits (corresponding to one of the characters) must be awaited before a step may again be carried out for the purpose of shifting the phase at the receiving end. This type of phasing operation has the disadvantage that comparatively much time is lost, and this is time that could better be used for the transmission of data.

An object of this invention is to provide data signal synchronizer which seeks to overcome the disadvantages of the prior art devices.

SUMMARY OF THE INVENTION

This and other objects are attained according to the invention wherein a code verifier checks groups of bits having single bits which, likewise, belong to at least one preceding group and/or at least one subsequent group of bits. In this way, the groups of bits are checked in overlapping fashion, whereby phasing at than receiving end can be performed in considerably less time that if a prior art telegraph signal synchronizer were employed.

To have at one's disposal as many check signals as possible, it is useful to cause the code verifier to check groups, whose bits, except the first bit, likewise belong to the subsequent group, and whose bits, except the last bit, also belong to the preceding group. Thus, exactly one check signal is obtained for each bit received, by which the phasing can be accelerated.

The group of bits is checked in overlapping fashion only until a code word is found. To accomplish this, a frequency divider is provided which delivers one output pulse, whenever as many input pulses are received by the divider as there are bits in a code word. The input pulses will be fed to this frequency divider via a first input of an AND gate; the AND gate is controlled by output pulses of the code verifier applied to another of its inputs. In this connection, an additional AND gate is provided having an input connected to the code verifier, as well as to the output of the frequency divider and an output connected over a NOT element to a second input of the AND gate.

In a preferred embodiment of the invention, the code verifier comprises a counter delivering a first signal (signal 0) if it counts a specified number, equal to the number of one of the two kinds of binary values of the code words, and delivering a second signal (signal 1) if its counter position differs from the specified number. A shift register is provided which stores the groups of bits. Upon receiving a preceding bit of the message and until receiving the subsequent bit of this message, the bits stored in the shift register are read out serially from the shift register over a feedback path and fed to the input of the same shift register. All the bits, except the preceding bit, of the message and the subsequent bit of the message are fed to the counter input.

BRIEF DESCRIPTION OF THE DRAWINGS

The principles of the invention will be most readily understood by reference to the description of a preferred embodiment, given below in conjunction with the drawings, the figures of which are briefly described as follows.

DETAILED DESCRIPTION OF THE DRAWINGS

Figure 1:
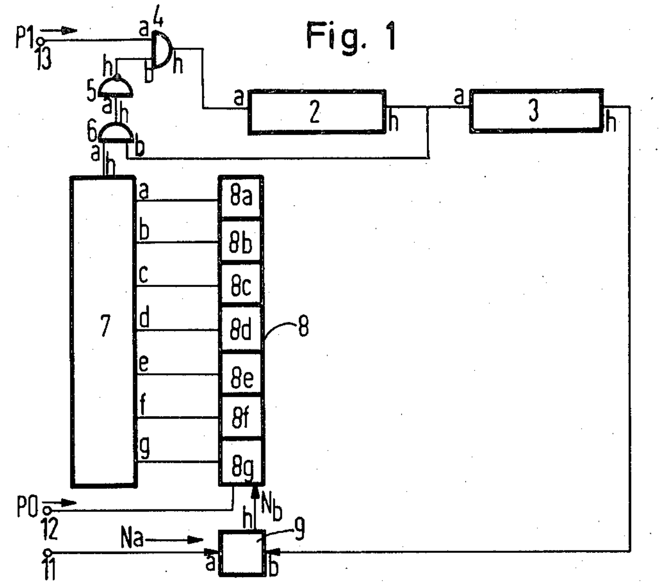
FIG. 1 is a schematic diagram illustrating the basic construction of a signal synchronizer.

The synchronizer in FIG. 1 is made up of frequency dividers 2 and 3, AND gate 4, NOT gate 5, AND gate 6, code verifier 7, shift register 8 and inverter 9. The frequency dividers, logic gates, shift register and inverter are of known construction and the code verifier is described in greater detail below in conjunction with FIG. 3.

Figure 2:
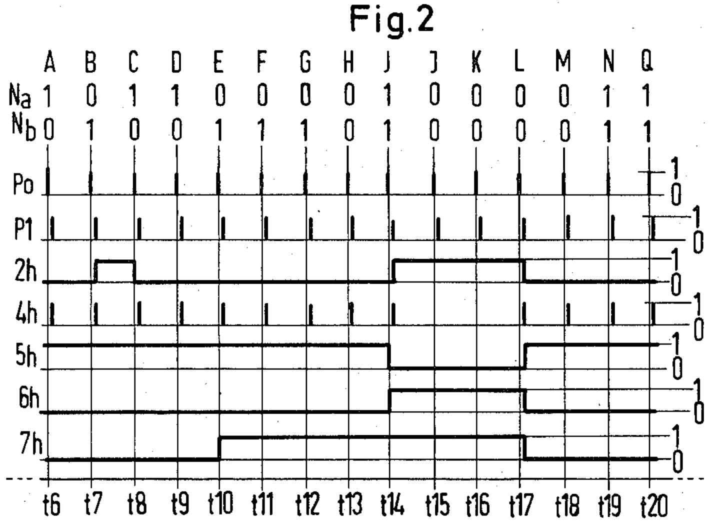
FIG. 2 is a pulse diagram, with reference to which the operating mode of the circuit arrangement in FIG. 1 will be explained.

A message N*a* is coupled into the synchronizer over terminal 11. This message is made up of a sequence of binary values 0 and 1, such as illustrated in FIG. 2. Seven consecutive binary values (bits) are assigned to one character, e.g., a letter of the alphabet or a number.

This message N*a* is fed to inverter 9, which reverses the polarity of seven consecutive bits at a time and which does not reverse the polarity of the next 21 bits. In the case under study, it is assumed that the polarity of the first seven bits, A, B, C, D, E, F, G are reversed, whereas the polarity of the following bits H, I, J, K, L, M, N, and O is not changed. The message N*b* is obtained in this way.

The message N*b* is fed to the shift register 8. The latter has seven bistable stages 8*a*, 8*b*, 8*c*, 8*d*, 8*e*, 8*f*, and 8*g* which store one bit at a time. Thus, the message Nb is fed to the stage 8*g*, and the single bits are each time shifted further by one stage using the shifting pulse $P_0$. Thus, exactly seven stages 8*a* to 8*g* are provided, matching the seven bits which are assigned to a character. The object of the character synchronizer shown in FIG. 1 is to provide a data receiver (not shown) with clock pulses, so that only seven consecutive bits forming a code word are registered at a time. The character synchronizer in FIG. 1 also provides the inverter 9 with clock pulses, so that only the polarities of consecutive bits forming a code word are reversed.

The stages 8*a* to 8*g* of shift register 8 are connected to code verifier 7 via the inputs *a, b, c, d, e, f, g*. The code verifier determines if the bits stored in shift register 8 belong to a character or not. If, for example, the code is built up such that a code word (corresponding to a character) has to consist of three values 1 and four values 0, then the code verifier 7 delivers a signal 0 or a signal 1, as the case may be, via the output 7*h*, if the binary values stored in the shift register 8 consist of three values 1 and four values 0.

The frequency divider 2 has a division ratio of 7 to 1, delivering a pulse via the output 2*h*, whenever seven pulses are fed to input 2*a*. The frequency divider 3 has a division ratio of 4 to 1 and delivers a pulse via its output 3*h*, if four pulses are fed to the input 3*a*.

The clock pulses PO or, as the case may be, P1, coupled to the synchronizer over terminals 12 or 13 have the same pulse repetition rate. These clock pulses are shown in FIG. 2. Each of these clock pulses is assigned to exactly one bit of the message N*a* and N*b*. The clock pulses P1 are slightly delayed with respect to the clock pulses PO.

The mode of operation of the circuit arrangement in FIG. 1 will be explained with reference to the pulse diagrams of FIG. 2. It is assumed that at the instant t6 a signal 0 is delivered from the output 7*h;* this means that the code verifier 7 has not detected an error and that the bits stored in shift register 8 belong to a code word (character). On this assumption, a signal 0 is delivered to the frequency divider 2 from the output 5*h*, and likewise, a signal 1 from the output 4h. If seven such pulses are coupled to the input 2*a*, an output pulse is delivered over output 2*h*. For the sake of simplicity, it is assumed that at the instant *t*7 the seventh pulse is delivered from the output 4*h*, so that, beginning at instant *t*7, an output pulse is delivered from the output 2*h*. This output pulse from the output 2*h* causes no alteration of the signal delivered via the output 5*h*, as long as a signal 0 is delivered from the output 7*h*. Therefore, at the instants *t*8 and *t*9, pulses are further delivered to the frequency divider 2 via the output 4*h*.

It is assumed that at the instant *t*10 the code verifier 7 detects an error and delivers a signal 1 to the output 7*h*. Subsequently, at the instants *t*11, *t*12, and *t*13 a signal 0 is delivered from the output 6*h*. If, until the instant *t*14, seven pulses have again been fed to frequency divider 2 over the outpu 4*h*, and one pulse is delivered from the output 2*h*, a signal 1 is obtained at the output 6*h*. A one output at 6*h* causes a signal 0 at output 5*h* and at output 4*h*, so that, at first, no further pulses are fed to the frequency divider 2 and the value 1 of the signal 2*h* is maintained. In this way, the pulse counting by the frequency divider 2 is interrupted until a signal 0 is delivered from the output 7*h*, which is the case at the instant *t*17.

Code checks are constantly performed by means of code verifier 7. For example, it is assumed that at the instant *t*15 the seven bits D, E, F, G, H, I, J (0111010) are checked. Since these seven bits contain four values 1, the seven bits, in this example, cannot be a code word (a code word would contain three values 0, as discussed above) and a signal 1 is delivered from the output 7*h* and a signal 0 from the output 4*h*. At the instant *t*16, the seven bits E, F, G, H, I, J and K (1110100) are checked. Since these seven bits again contain four values 1 in all, they cannot be a code word, and a signal 1 is again delivered from the output 7*h* and a signal 0 is produced from the output 4*h*.

At the instant *t*17, the seven bits F, G, H, I, J, K and L (1101000) are checked, and since these seven bits contain three values 1 and four values 0, a signal 1 is coupled over output 4*h*. Thus, the code verifier 7 checks groups of bits whose single bits belong at least to one preceding group and/or also to at least one subsequent group. For example, the code verifier 7 checks at the instant *t*16 a group consisting of the bits E, F, G, H, I, J and K. In this case, bits E, F, G, H, I, and J also belong to the preceding group with the bits D, E, F, G, H, I, and J, and the bits F, G, H, I, J, and K also belong to the following group with the bits F, G, H, I, J, K and L.

The frequency divider 2 starts counting again from the instant *t*17 by virtue of the pulse received from the output 4*h*, and after seven pulses, it again delivers an output pulse via the output 2*h*.

At the instant *t*18, the bits G, H, I, J, K, L and M are checked, and a signal 1 is delivered from the output 7h, because no code word is involved. However, this signal 1 (error signal) remains inoperative, since a signal 0 is delivered over the output 2*h* of the frequency divider 2. Thus, an overlapping check is performed only as long as no code word is found. From the instant *t*17, when a code word has been found, the signals of the code verifier 7 become operative only periodically at instants corresponding to the instant *t*7. These are the instants when a signal 1 is delivered from the output 2*h*. If at these instants signals 1 or signals 0 are delivered via the output 7*h*, then the feeding of further pulses to the frequency divider 2 is stopped or not stopped.

The output pulses of the frequency divider 2 are coupled to frequency divider 3 over input 3a with the frequency divider 3 delivering an output pulse to inverter 9 over the output 3*h* with every fourth pulse, and at a division ratio of 4 to 1.

In this way, the inverter 9 is controlled such that it reverses the polarity of the group with the seven consecutive bits A, B, C, D, E, F and G, and does not reverse the polarity of the 21 subsequent bits (three groups). By using the inverter 9, a message N*b* is obtained if there is no faulty transmission, just as it has appeared at the transmitting end (prior to the polarity reversal). In many transmission systems, it is common practice to reverse, at the transmitter, the polarity of the bits of every eighth character. In this case, instead of the frequency divider 3, a frequency divider is provided having a division ratio of 8 to 1. Thus, the inverter 9 reverses the polarity of a group of seven consecutive bits and does not reverse the polarity of forty-nine consecutive bits (seven groups).

Figure 3:
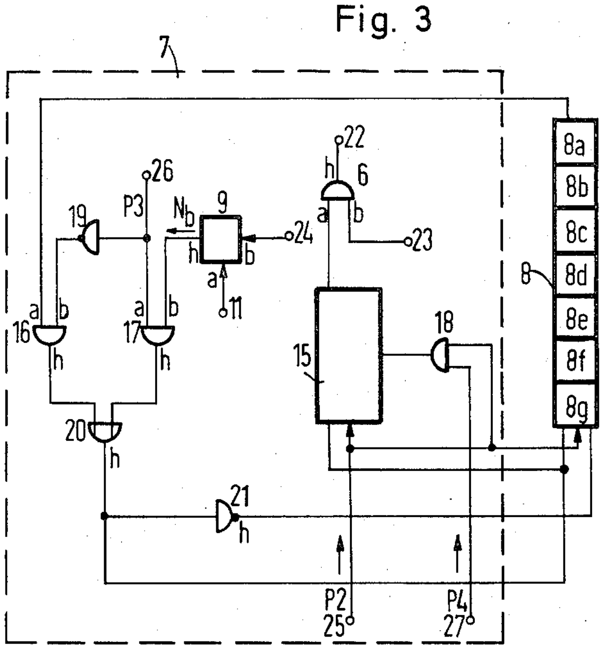
FIG. 3 is a schematic diagram of a preferred embodiment of the code verifier in FIG. 1.

FIG. 3 shows a preferred embodiment of the code verifier 7 illustrated in FIG. 1. This code verifier comprises a binary counter 15, AND elements 16, 17, 18, NOT element 19, OR element 20 and NOT element 21.

Each of the aforementioned logic elements is of conventional construction.

Figure 4:
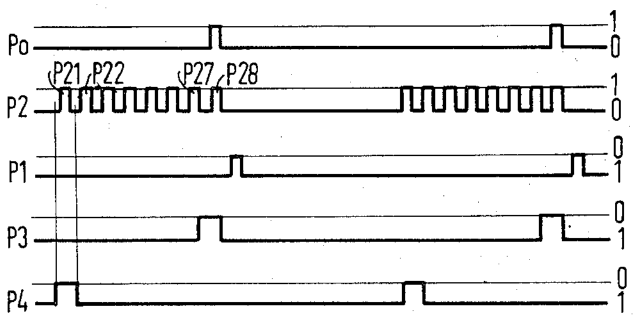
FIG. 4 is a pulse diagram, with reference to which the operating mode of the code verifier of FIG. 3 will be explained.

A terminal 22 is connected to input 5*a* of AND gate 5 (FIG. 1). A terminal 23 is connected to the output 2*h* of frequency divider 2 (FIG. 1). The output pulses of the frequency divider 3 (FIG. 1) are applied over terminal 24. The pulse trains P2, P3 and P4 are received, respectively, over terminals 25, 26 and 27. The pulse trains P2, P3 and P4 are shown in FIG. 4.

Counter 17 in the known manner is constructed to seven and delivers a signal 0, if the counter position is set at "three," and it gives a signal 1, if the counter is set at another position.

The mode of operation of the circuit arrangement in FIG. 3 will now be described with reference to the pulse diagrams shown in FIG. 4.

It must first be assumed that the bits A, B, C, D, E, F and G of the message N*b* are stored in the stages 8*a* to 8*g* of the shift register. The pulses P2 are used as shifting pulses. Shortly after the appearance of the pulse P21, the bit A stored in the stage 8*a* is transferred via AND element 16 and OR element 20 and stored in stage 8*g*. Concurrently, the bits B, C, D, E, F and G stored in the stages 8*b* and 8*g* are shifted to the stages 8*a* and 8*f* by one stage at a time, so that after this operation, the bits B, C, D, E, F, G, A, are stored in the stages 8*a* to 8*g*.

Normally, the counter position of counter 15 increases by 1, by virtue of a signal 1 delivered to the counter 15 from the output *h* of OR element 20. However, the counter position does not increase by virtue of the bit A, because the counter 15 is reset as a result of the simultaneous appearance of the pulses P21 and P24 and the use of the AND element 18, so that the counter 15 does not count.

All the bits B, C, D, E, F and G are serially read out from the shift register over stage 8*a* and serially coupled into stage 8*g* by the six pulses P22 to P27. Thus, with the pulse P27 the same combination of binary values (A, B, C, D, E, F, G) is written in the shift register as prior to the occurrence of the pulse P21 in the shift register. The values 1 of the bits B, C, D, E and F are counted, while the bits B, C, D, E, F and G are being fed back.

Pulse P3 is coupled over terminal 26 and is produced, for example, in the course of the duration of the pulse P28 of the pulse train P2. This pulse inhibits AND element 16 through the use of NOT element 19, so that the bit A read out from the stage 8*a* does not disturb the further process. However, the AND element 17 is therewith enabled to transmit bit H of the message N*b* (fed via the output 9*h*).

In this way, the new bit H of the message N*b* is stored in the stage 8*g* and counted by the counter 15. The pulse P28 has the same effect as the pulse PO fed over terminal 12 (FIG. 1). Thus, altogether, the six bits B, C, D, E, F and G (fed via the AND element 16), and the new bit H of the message N*b* (fed via AND element 17) are counted. If the counter position is set at "three," a signal 0 is delivered via the output 6*h*, and if the counter is set at another position, a signal 1 is delivered via the output 6*h* and via the terminal 22.

Finally, it should be noted that the telegraph signal synchronizer is not limited to the code verifier 7, but may also be operated with code verifiers of different constructions.

The invention has been described herein in terms of a specific embodiment, which is to be considered only as being exemplary. Modifications to or changes in the described embodiment may be made, while being within the scope of the invention, as defined by the appended claims.

I claim:

1. In a data signal synchronizer for controlling the phasing of data signals received at a data receiver, the data signals being formed into bit groups, each said group corresponding to a code word, said synchronizer having a code verifier for testing said bit groups to determine whether they form code words and to produce an output signal having a value depending on the presence or absence of a code word, the improvement comprising:

means in said code verifier for causing said verifier to test bit groups having at least one bit contained in at least one of a preceding bit group and a subsequent bit group, first frequency divider means for producing an output pulse upon receiving a number of bits of said received data signal corresponding to the number of bits constituting a code word, first logic gate means for controlling the flow of bits of said received data signal to the said first frequency divider means responsive to the value of said output signal from said code verifier and second logic gate means for controlling the transmission of said code verifier output signal to said first logic gate means responsive to said first frequency divider output signal.

2. The data signal synchronizer defined in claim 1 wherein said code verifier is constructed to test bit groups wherein all but the first bit are contained in a subsequent bit group and wherein all but the last bit are contained in a succeeding group.

3. The data signal synchronizer defined in claim 1 wherein said code verifier comprises:

counter means for producing an output signal of a first value upon counting to a total corresponding to the total of the predetermined binary values constituting a code word and an output signal of a second value when a count is reached other than said predetermined total during the counting period, shift register means for storing at least a group of bits, feedback means for serially taking the bits from said shift register and recirculating them to an input of said shift register, said feedback means operating after receipt of a preceding bit of a message and until receiving the subsequent bit of the message and means for coupling all but a first-stored bit in said shift register to said counter along with a bit immediately following the group of bits stored in said shift register.

4. The data signal synchronizer defined in claim 3 further comprising:

a logic network for enabling the storing of bits in said shift register while bits of a message are being received and for inhibiting said feedback means prior to receiving the preceding bit of the message and after receipt of the subsequent bit.

5. The data signal synchronizer defined in claim 1 further comprising:

inverter means for periodically reversing the polarities of predetermined groups of bits applied to the receiver, said inverter means operating responsive to the output signal from said frequency divider.

6. The data signal synchronizer defined in claim 5 further comprising second frequency divider means interposed between the output of said first frequency divider and said inverter, the first frequency divider output signal being further divided for controlling said inverter.

* * * * *